US007974645B2

(12) United States Patent
Choi-Grogan

(10) Patent No.: US 7,974,645 B2
(45) Date of Patent: Jul. 5, 2011

(54) MOBILE REGISTRATION USING A SERVICE AREA IDENTIFIER OR PLURALITY OF SERVICE AREA IDENTIFIERS

(75) Inventor: Yung Shirley Choi-Grogan, Issaquah, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 726 days.

(21) Appl. No.: 11/468,578

(22) Filed: Aug. 30, 2006

(65) Prior Publication Data

US 2008/0057955 A1    Mar. 6, 2008

(51) Int. Cl.
*H04W 68/00* (2009.01)
(52) U.S. Cl. ............... 455/459; 455/461; 455/404.2; 455/432.1; 370/328; 370/338
(58) Field of Classification Search .............. 455/432.1, 455/436, 435.1, 404.2, 456.1, 404.1, 405, 455/414.1, 445, 415, 433, 435.2, 461, 417, 455/459; 370/328–338
See application file for complete search history.

(56) References Cited

U.S. PATENT DOCUMENTS

| 5,305,466 | A | 4/1994 | Taketsugu | |
|---|---|---|---|---|
| 5,594,945 | A | 1/1997 | Lewis et al. | |
| 5,649,286 | A | 7/1997 | Frerking | |
| 6,421,330 | B1 | 7/2002 | Chung et al. | |
| 6,529,725 | B1 * | 3/2003 | Joao et al. | 455/406 |
| 6,738,639 | B1 | 5/2004 | Gosselin | |
| 7,310,523 | B1 * | 12/2007 | Cook et al. | 455/426.1 |
| 2002/0068580 | A1 * | 6/2002 | Bala et al. | 455/456 |
| 2003/0139141 | A1 * | 7/2003 | Marjamaki et al. | 455/67.1 |
| 2003/0148774 | A1 * | 8/2003 | Naghian et al. | 455/456 |
| 2004/0018836 | A1 * | 1/2004 | Jang | 455/422.1 |
| 2004/0171367 | A1 | 9/2004 | Seligmann | |
| 2006/0099935 | A1 | 5/2006 | Gallagher et al. | |
| 2007/0015522 | A1 * | 1/2007 | Ruutu et al. | 455/456.3 |

(Continued)

OTHER PUBLICATIONS

U.S. Appl. No. 11/531,013, entitled "Mobile Provisioning Using a Service Area Identifier or Plurality of Service Area Identifiers," filed Sep. 12, 2006, naming Choi-Grogan, Daly, and Silverman as inventors.

(Continued)

*Primary Examiner* — Marivelisse Santiago-Cordero
*Assistant Examiner* — Quan M Hua
(74) *Attorney, Agent, or Firm* — Zagorin O'Brien Graham LLP

(57) ABSTRACT

A method of registering a mobile device in a mobile telecommunications network comprises the device's receiving power from a power source and transmitting a registration request signal including mobile device identification data, an associated mobile network determining a set of latitude and longitude location coordinates for the transmitting mobile device, comparing the determined set of latitude and longitude location coordinates with a table for matching the location coordinates with a service area code, determining a service area code responsive to the comparison, and storing the service area code, the mobile device identification data, the determined service area code and a location area code of the associated public mobile network for registering the mobile device in the associated mobile network. A related mobile device comprises a power source, a processor for determining whether power has been actuated, a global positioning system for determining a set of latitude and longitude location coordinates for the transmitting mobile device, the processor for comparing the determined set of latitude and longitude location coordinates with a table for matching the location coordinates with a service area code, determining a service area code responsive to the comparison and storing the service area code in memory of the mobile device.

14 Claims, 6 Drawing Sheets

U.S. PATENT DOCUMENTS

2007/0167175 A1* 7/2007 Wong et al. ................ 455/456.5

OTHER PUBLICATIONS

U.S. Appl. No. 11/468,571, entitled "Mobile Paging Using a Service Area Identifier or Plurality of Service Area Identifiers," filed Aug. 30, 2006, naming Choi-Grogan as inventor.

3GPP TS 23.003 (3rd Generation Partnership Project; Technical Specification Group Core Network and Terminals; Numbering, addressing and identification (Release 7),V7.0.0, Jun. 2006, 1-50.

Non-Final Office Action mailed Jul. 28, 2009 in U.S. Appl. No. 11/468,571, 11 pages.

Non-Final Office Action mailed Jun. 3, 2009 in U.S. Appl. No. 11/531,013, 8 pages.

* cited by examiner

MOBILE REGISTRATION USING A SERVICE AREA IDENTIFIER OR PLURALITY OF SERVICE AREA IDENTIFIERS

TECHNICAL FIELD

The technical field relates to mobile telecommunications systems generally and, more particularly, to registration of a mobile telecommunications device at a greater level of granularity than a local area code as defined below and in various mobile telecommunications standards.

BACKGROUND

When a wireless telecommunications service provider receives an incoming call destined for a subscriber of that wireless service provider, the service provider, typically via a mobile switching center (MSC) to a base station controller (BSC) or a radio network controller (RNC), which may be generally referred to herein as a controller, receives the destination telephone number of the subscriber. A typical international wireless destination telephone number comprises a country code and a national mobile number including a national destination code (NDC) and a subscriber number. One or more NDC's are allocated to a public land mobile network (PLMN). In the North American numbering plan, the country code is altered to a typical ten digit format (eleven digits including a "1" prefix considered by many a "North American country code"). A wired telephone typically has a ten digit number in North America having an area code and a seven digit wired line number where the first three digits represent an exchange within an area code.

The MSC for a given service provider then matches the wireless destination telephone number with a so-called location area code or LAC by means of a look-up table memory. A local area identification (LAI) typically represents a mobile country code (MCC), a mobile network code (MNC) and a location area code (LAC). The LAC identifies a location area within a PLMN. The MSC then typically signals the controller, (BSC or RNC), within this LAC to page and locate the called subscriber.

Today, it is known to use the LAC to define an area comprising a number of cells or sectors that may number in the hundreds or even thousands. U.S. Pat. No. 5,649,286 to Frerking issued Jul. 15, 1997, describes location areas associated with the GSM standard in a Background of the Invention section along with associated problems. The LAC typically comprises a large geographical area which may or may not be contiguous. For example, the service provider (PLMN) may be Cingular or Verizon and the LAC defined as the territory covered by that service provider which can be the greater portion of the United States of America. The BSC or RNC then determines all of these hundreds or even thousands of cells or sectors for the LAC during the process of terminating an incoming call to a PLMN subscriber. The BSC or RNC then causes the mobile device to which the call is destined to be paged in each and every one of the hundreds or thousands of cells or sectors associated with the LAC. The object of the page is to locate a given mobile device, referred to herein as user equipment (UE), and to complete the incoming call from the public switched telephone network (PSTN) to the mobile device responding to the page. Mobile device as used herein is intended to include portable devices such as personal devices which may be fixed in a location, receive wireless communications or not, necessarily, be used in a mobile environment such as an automobile. This LAC paging process is defined in third generation (3G) Universal Mobile Telephone Service (UMTS) as well as second generation (2G) Global System for Mobile Communications (GSM) standards and is expected to continue in future versions of such wireless standards.

Typically, a mobile device (UE) may be "off" (no power), "on" (powered) and able to receive calls, or "on" and in a mode of not being set to receive calls. In any "on" state, the mobile device or UE registers with the service provider (PLMN) and, in so doing, the service provider identifies the LAC in which the mobile is presently located. The MSC of the associated wireless service provider records or registers the mobile device in its database as being associated with the LAC in which it registers. This database is referred to as a home location register (HLR). A temporary copy called a visitors' location register may be established if and when a mobile device may roam into a different area served by the HLR. The HLR and its copy, the VLR, may be generally referred to as a location register.

If the mobile device (UE) is in an "off" state, an incoming call to the mobile may be connected to voice-mail, for example, for the wireless subscriber to retrieve later. The mobile device (UE) cannot provide its current location area code (LAC) because it is powered down and unable to receive or transmit registration control signals or respond to a page. A UE in an "off" state is paged from a BSC or an RNC in the LAC in which it last registered.

If the subscriber mobile is "on" and not receiving calls, the subscriber may receive a "missed call" indication and/or an indication of voice messaging. In any "on" status and in a mode of mobile device actuation when a call may be connected or if the mobile is in an "off" state, network resources are wasted in causing paging control signals to be transmitted to hundreds or thousands of cells or sectors from, for example, a base station controller (BSC) or a radio network controller (RNC) to be then rebroadcast from a plurality of base stations throughout a LAC for paging one mobile device or UE.

Recently, standards organizations have defined a service area code (SAC) and a service area identifier (SAI). The SAI is an unique combination of LAC and SAC for a PLMN. The SAC or SAI is smaller than a LAC in terms of the number of cells or sectors it comprises. In particular, in UMTS, an SAC or SAI has been defined at a greater granularity than a Local Area Code (LAC). The SAI, for example, is defined for UMTS third generation (3G) partnership project PP in Technical Specification (TS) 23.003 at section 12.5. The SAI may be provisioned to identify a group of cells or sectors within a LAC as follows: the logical summation of a Public Land Mobile Network (PLMN) given by its identifier (ID), the location area code (LAC) and the service area code (SAC). The SAI defines an area consisting of one or more cells or sectors belonging to the same location area code (LAC). The SAI may comprise, for example, as few as one or a plurality of cells or sectors.

Referring to FIG. 1, there is shown a large circle 100 defining a first LAC or LAC #1 comprising hundreds or even thousands of cells or sectors represented by circles or ellipses 120-1 to 120-n. This LAC 100 may represent the territory covered by a cellular service provider such as Cingular in the United States but is not intended to be so limited. The service provider (PLMN) and LAC#1 of FIG. 1 may be international and represent a service provider in a foreign country. Typically, a LAC is an area comprising a plurality of cells controlled by a controller (RNC or BSC). The LAC#1 may comprise micro-cells or include WiFi LAN's or links and may comprise a location area of any mobile service including newer overlay services such as WiMax to a mobile device (UE), for example, a personal computer or Personal Communications Service (PCS) mobile device (UE).

Each cell or sector shown in FIG. 1 is typically associated with a fewer number of base stations of which eight are shown 110-1 to 110-8 and/or antenna sites covering a group of cells or sectors. For example, a single base station, for example, 110-1, may broadcast to three or up to six cells or sectors, depending on the mobile service standard followed. Again, eight base stations 110-1 to 110-8 are shown in FIG. 1 (110-2 is shown located in cell or sector 120-9) with surrounding cells and sectors (for example, cell or sector 120-8, in which a mobile device 130-4 that needs to be paged is located) as well as the cell or sector in which they are located. A paging control signal typically is broadcast from a common BSC or RNC to each and every cell or sector in LAC#1 100 via the proximate base station. The base station, for example, base station 110-2 then rebroadcasts the paging control signal to its cell or sector 120-9 and surrounding cells or sectors 120-8 in which a registered UE 130-4 may be located at the time of the page.

Notice that FIG. 1, while drawn to suggest that each cell or sector is of the same radius, may comprise cells or sectors of unequal radius or comprise links to premises-based networks, for example, in corporations, universities, airports, private residences and the like. The cells and sectors may overlap, for example, for hand-off purposes for, for example, roaming when a power level of transmission indicates that a hand-off is appropriate from one base station, cell or sector to another as a mobile device (UE) moves. Moreover, a mobile device may move outside a LAC#1 to another LAC for another service provider (a different PLMN-ID) and LAC's for different service providers may overlap.

FIG. 1 shows four registered UE's 130-1 to 130-4 in LAC#1. The four registered UE's 130-1 to 130-4 are proximate to four base stations 110-1 to 110-4. Each registered UE is proximate to a respective base station (or may be located on a border between two cells covered by two different base stations). Nevertheless, FIG. 1 suggests that a UE may have registered in the LAC#1 for a first service provider (with a given PLMN-ID) as well as three other UE's which have registered in the same LAC#1 by way of example and be in a powered up "on" state. So if there are four incoming calls to these "on" and registered four UE, there are required four simultaneous sets of paging control signals for these four UE or up to four times the number of base stations must be paged to complete respective calls. Then, the respective base stations 110 in turn may send up to six paging control signals (depending on how many cells or sectors are covered by a given base station 110) to reach the four UE's 130-1 to 130-4. A PLMN may via a directional antenna equipped base station page a service area code by cell or sector. Consequently, paging by service area code can save use of valuable radio frequency spectrum and conserve power. (According to the prior practices of paging by LAC, a base station would page all its cells and sectors wasting power and spectrum.) Moreover, paging by service area code from a given base station can not only reduce power consumption and conserve spectrum, interference between signal transmissions can be reduced as well. More power and code resources can be allocated to end users, for example, for their data reception (and user data transmission). It may be seen from FIG. 1 that as the number of registered mobile devices increases within LAC#1 100, the resources expended for paging expands almost exponentially.

Also, the larger the LAC area, the greater is the probability of paging congestion. FIG. 1 is greatly simplified showing only eight base stations and less than one hundred cells or sectors. This probability increase is, for example, because the larger the LAC area, the more likely there are even more than four or even four hundred, four thousand or four hundred thousand UE's that are all "on," registered and must be simultaneously paged, there are hundreds, in deed thousands of base stations per UE that must be signaled and these in turn must send control signals to a multiple, for example, of at least three of the thousands of cells or sectors within their respective antenna reach. Consequently, more paging channels are needed in a paging by LAC environment to address paging congestion and more power and codes will be consumed via paging overhead rather than being allocated to the user for their receipt and transmission of their data.

Nevertheless, FIG. 1 also demonstrates that there exist four base stations 110-5 to 110-8 remote from an "on" registered UE that do not need to broadcast paging control signals that are within the LAC; yet, these base stations will unnecessarily page UE that is not in their reach according to current GSM/UMTS standards. Consequently, there remains a problem in the wireless telecommunication art of paging congestion that requires solution. The opportunity to solve such a problem begins with registration. Provisioning for services at a level of granularity between cell and sector or base station on the one hand and LAC on the other is also a problem in the art. Henceforth in the specification and claims, a cell or sector (terms used similarly in accordance with different mobile standards) shall be referred to as a cell, a radio network controller and a base station controller may be referred to collectively as a controller and a mobile device may collectively refer to either devices which are mobile or fixed but communicate over a wireless link and so include portable devices such as personal communications devices, terminals and computers.

SUMMARY OF THE INVENTION

The problems of paging congestion and related problems of providing more resource efficient registration, provisioning for services and paging in a mobile network are solved in accordance with several aspects and embodiments of which there exist at least six. In accordance with a first aspect or embodiment, a method of registering a mobile device in a public mobile network comprises the device's receiving power from a power source and transmitting a registration request signal including mobile device identification data, an associated public mobile network determining a set of latitude and longitude location coordinates for the transmitting mobile device, comparing the determined set of latitude and longitude location coordinates with a table for matching the location coordinates with a service area code, determining a service area code responsive to the comparison, and storing the service area code, the mobile device identification data, the determined service area code and a location area code of the associated public mobile network for registering the mobile device in the associated public mobile network. As used in the claims, a service area code is intended to encompass both a service area code or service area identified and any equivalent service area defined as a single or plurality of cells which is smaller in granularity than a local area code. A related mobile device comprises a power source, a processor for determining whether power has been actuated, a global positioning system for determining a set of latitude and longitude location coordinates for the transmitting mobile device, the processor for comparing the determined set of latitude and longitude location coordinates with a table for matching the location coordinates with a service area code, determining a service area code responsive to the comparison and storing the service area code in memory of the mobile device.

In accordance with a further aspect, a method of registering a mobile device in a public mobile network comprises receiving power from a power source, determining a set of current location data of the powered mobile device, comparing the determined set of location data with a table for matching the current mobile device location data with service area code data, determining a service area code responsive to the comparison, and transmitting the determined service area code for registering the mobile device in an associated public mobile network. A related mobile device comprises a power source, a controller, responsive to power, for determining a set of latitude and longitude location coordinates of the powered mobile device, for comparing the determined set of latitude and longitude location coordinates with a table for matching the location coordinates with a service area code and for determining a service area code responsive to the comparison, and a radio transmitter for transmitting the service area code for registering the mobile device in an associated public mobile network.

In accordance with a further aspect, a method of obtaining and storing a service area code for a registering mobile device of an associated public mobile network comprises receiving periodic registration request signals from a registering mobile device including mobile device identification data at a plurality of base stations, determining a set of location data for the transmitting mobile device by comparing results of measurements at the receiving base stations, comparing the determined set of location data with a memory table for matching the location coordinates with a service area code, determining a service area code responsive to the comparison, and storing the service area code, the mobile device identification data and a location area code of the associated public mobile network for the registering mobile device in the associated public mobile network. A related wireless network system comprises a plurality of base station receiver for receiving periodic registration request signals from a registering mobile device including mobile device identification data, a controller for determining a set of latitude and longitude location coordinates for the transmitting mobile device by comparing results of measurements at the receiving base stations, comparing the determined set of latitude and longitude location coordinates with a table for matching the location coordinates with a service area code, determining a service area code responsive to the comparison, and storing the service area code in memory, the mobile device identification data and a location area code of the associated public mobile network for registering the mobile device in the associated public mobile network.

In accordance with a further aspect, a method of provisioning a service area code of an associated public mobile network comprises determining latitude and longitude coordinate location data defining each cell of the associated public mobile network, associating a plurality of cells with one of an entity, a geographic area and a service of the associated public mobile network, determining latitude and longitude coordinate location data for the associated plurality of cells and storing the determined latitude and longitude coordinate location data of the associated plurality of cells as the provisioned service area code. An example of an entity may be a campus of a corporation or a college or university. An example of a geographic area may be an automobile traffic congestion area, a known potential natural disaster area or an advertising target area. An example of a service may be emergency alert service, short message service or interactive game play services. In accordance with a related aspect, a method of provisioning a collection of provisioned service area codes comprises determining location coordinate data for one of an entity, geographic area and a service of the associated public mobile network, determining a collection of service area codes for the determined location data and provisioning the determined collection of service area codes as representative of the entity, geographic area or service.

In accordance with a further aspect, a method of paging a registered mobile device of an associated public mobile network capable of receiving paging signals comprises determining a location area code responsive to an incoming call to a wireless destination number of the associated public mobile network, determining last registration data including location area code for the registered mobile device having the wireless destination number, transmitting paging control signals to cells from a plurality of base stations within the location area code for the associated public mobile network, determining if last registration data for the mobile device further comprises a service area code, if the last registration data for the mobile device comprises a service area code, ceasing transmission of paging control signals to cells within the location area code, determining at least one base station for the service area code of the last registration data and beginning transmitting paging control signals from the determined at least one base station.

In accordance with a related aspect, a method of paging a registered mobile device of an associated public mobile network capable of receiving paging signals comprises determining if last registration data for the registered mobile device further comprises a service area code, if the last registration data for the mobile device comprises a service area code, ceasing transmission of paging control signals to cells within the location area code, determining at least one base station for the service area code of the last registration data and beginning transmitting paging control signals from the determined at least one base station. By following this paging method, a given public mobile network may treat the paging of a mobile device by service area code as optional and a standards body need not dictate a requirement that paging by service area code be practiced.

In accordance with a paging method that does not use the location area code, a method of paging a registered mobile device of an associated public mobile network capable of receiving paging signals comprises determining if last registration data for the registered mobile device further comprises a service area code, if the last registration data for the mobile device comprises a service area code, determining at least one base station for the service area code of the last registration data and transmitting paging control signals from the determined at least one base station.

Consequently, when a mobile device registers in a LAC, it may also register within a smaller area or service area identifier (SAI) or SAC within that LAC of that particular service provider. The service provider (PLMN) may provision the cells of an SAI as it deems appropriate. For example, emergency alert services or other services may be provisioned by defining a service area code or plurality of service area codes. Finally, the paging congestion associated with the paging of a location area code may be minimized by paging only a provisioned service area code during an incoming call. These and other aspects and embodiments will now be further described in reference to the drawings and detailed description thereof.

BRIEF DESCRIPTION OF THE DRAWINGS

FIG. 3b represents a simplified block diagram of a mobile device for use in the wireless network of FIG. 3a.

DETAILED DESCRIPTION OF PREFERRED EMBODIMENTS

Figure 1:
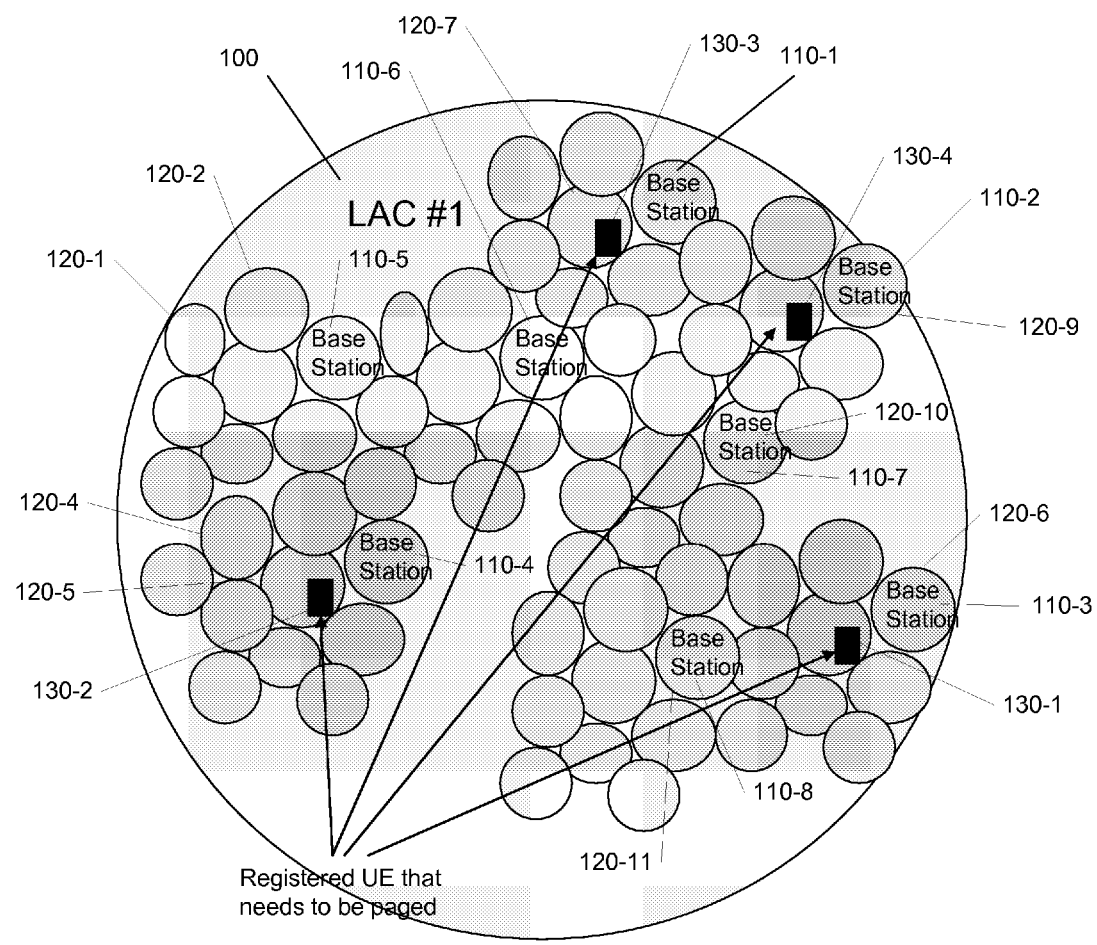
FIG. 1 represents a location area code and depicts a plurality of hundreds of cells within the location area code, some of which have associated base stations for broadcasting paging control signals, the location area code also including for mobile devices (UE) which, in the event of an incoming call to each and each being in a powered up state, each UE must be paged.
Figure 2:
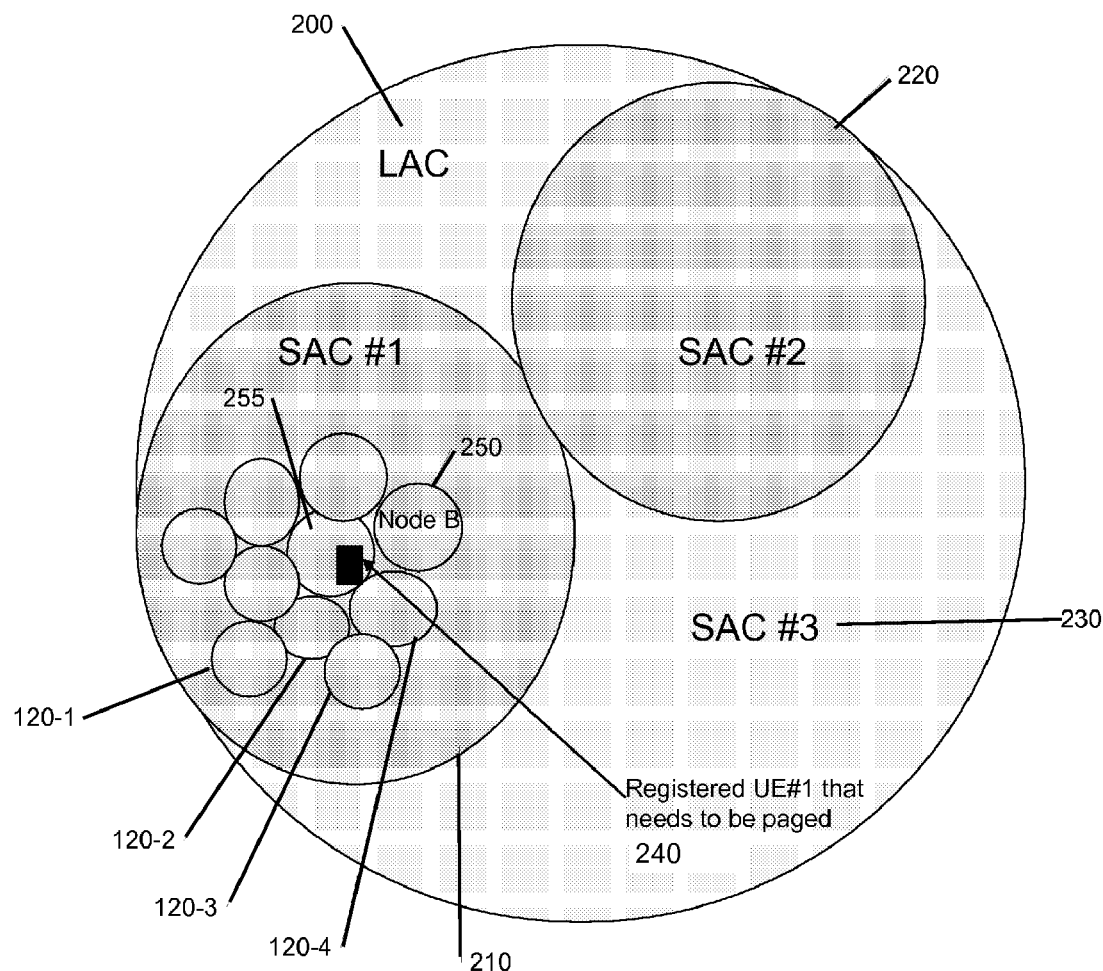
FIG. 2 represents the location area code 100 of FIG. 1 further defining at least one service area code.

FIG. 2 represents the circular representation of a location area code, LAC#1 100 of FIG. 1, further defining at least one service area code of which three are shown by way of example 210, 220, 230. As described above, a location area code 100 does not represent a circular area but may be the area covered by the United States of America (typically, not larger than a country) depending on the extent of area service coverage of a given wireless service provider in that country or other country or portion of a country or several countries. It may not be contiguous, for example, a LAC 100 may have zones of no coverage and islands of coverage outside a zone such as Alaska or Hawaii lying outside the United States but within the same LAC.

The first digit of a reference numeral as used herein represents the first figure in which a depicted element first appears. Consequently, for example, service area codes 210, 220 and 230 are first introduced in FIG. 2 and so each begin with a 2 while LAC 100 was first introduced in FIG. 1.

As defined above, a service area code may comprise as few as one cell, for example, if SAC#2 220 comprises one cell. Also, referring briefly to FIG. 3a, a location area code such as LAC#1 100 is typically associated with a controller 350 of a wireless network (PLMN) 300 which may be a radio network controller (RNC) or a base station controller (BSC) 350 or other controller name depending on the mobile standard terminology. The controller is typically associated with a mobile switching center (MSC) 320, which may comprise a media gateway for interconnecting with IP, ATM and other PSTN networks or other switching center or gateway which connects by radio or wired links to base station 250 (also, per FIG. 3a, BS-1, BS-2, . . . BS-m; 370-1, 370-2 . . . 370-m) from which, for example, registration request signals are received from powered mobile devices 240 and, for example, paging control signals are broadcast from respective transmitting antenna sites such as node B, base station 250 or a base station 370 of FIG. 3a.

A mobile device (UE) 240 registers with a wireless network service provider 300 (PLMN) associated with LAC 100 and, in accordance with an aspect of the invention, registers using its unique terminal identification, location area code and service area code. Consequently, in FIG. 2, for example, mobile device UE#1 240 registers in service area code 210 which may comprise a plurality of cells 120-1 through 120-n where n is a natural number. Also, there exists at least one base station or Node B 250 within one of the cells of SAC#1 210. As described above, antennas of the base station 250 receive, for example, registration request signals from mobile devices 240 and broadcast, for example, paging control signals. SAC#3 230, by way of example only, may comprise the remainder of LAC#1 100. There may be hundreds of SAC's per LAC according to known mobile standards and as few as one. However, in accordance with a second aspect of the present invention, a SAC may be provisioned, for example, in accordance with a given geographical area, a service or an entity among other choices to comprise a plurality of cells or, in turn, a collection of SAC's may be provisioned to match a service or geographic area.

Now, the several aspects of the invention will be discussed in connection with FIGS. 1-5 including but not limited to: mobile device registration, provisioning a service area code, paging by service area code and associated apparatus.

Mobile Device Registration

Figure 3A:
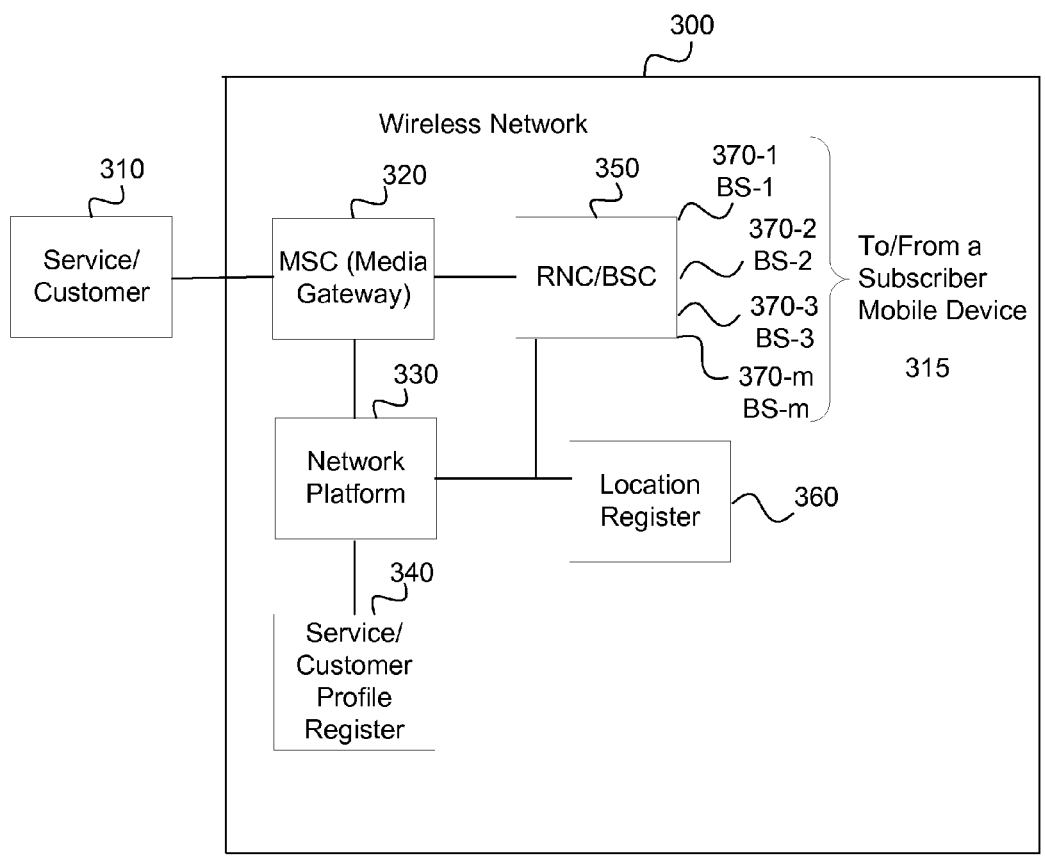
FIG. 3a represents a simplified block diagram of wireless network apparatus for provisioning and originating a service according to a service area code or collection of service area codes.
Figure 3B:
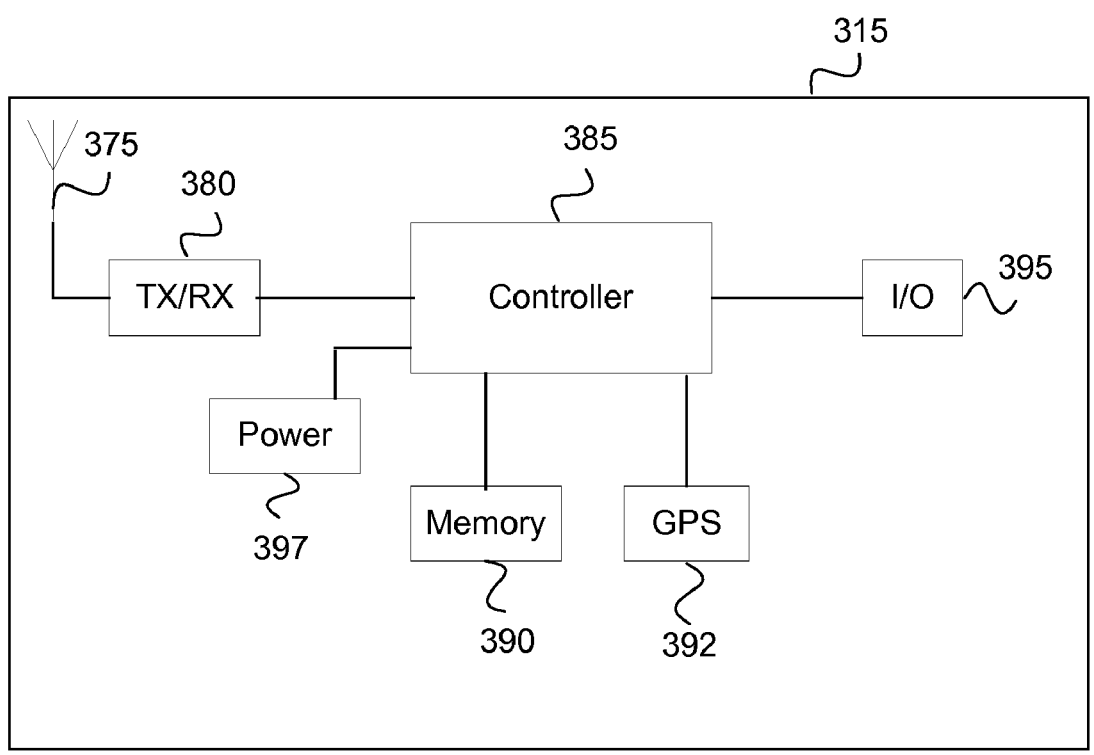

Referring to FIGS. 1 and 2, a method of registering a mobile device in a public mobile network will now be discussed involving the assignment of a SAC per FIG. 2 to a UE, for example 130-1 of FIG. 1. FIG. 2 represents the location area code 100 of FIG. 1 further defining at least one service area code. Assume, per FIG. 2, that a SAC has been defined, for example, SAC#1 210 comprising a number of cells 120, each of which are defined by a geographic area. Referring briefly to FIG. 3b, assume that mobile device 130-1 needs to be registered and comprises a controller 385, a memory 390, a radio transceiver 380 and an internal GPS system 392 for reporting its position. Once the mobile device 130-1 receives power from a power source 397 (is turned on by a user) the device transmits a registration request signal including its mobile device identification data. A method of registering device 130-1 may also include the step of transmitting location coordinates of mobile device 130-1 if the mobile device 130-1 is equipped with GPS 392. If the mobile device 130-1 is not equipped with GPS, an associated public mobile network may determine a set of latitude and longitude location coordinates for the transmitting mobile device 130-1 by known processes. Some of these known processes include base station triangulation based on received base station power levels of the registration request signal transmitted by mobile device 130-1 and other known methods of determining a mobile device's location. With either the GPS equipped or not equipped apparatus 130-1, the wireless network controller 350 (FIG. 3a) may determine approximate location data for apparatus 130-1. The wireless location controller 350 in known fashion compares the determined set of location data with a table for matching the location coordinates with a location area code. In addition, according to one aspect of an embodiment, the network controller 350 may similarly determine a service area code defined by location data within the same or a similar memory table such as a location register. The network controller 350 then determines a service area code responsive to the comparison and causes the service area code data to be stored with the mobile device identification data and the location area code of the associated public mobile network for registering the mobile device in the associated public mobile network. Also, according to another aspect, when the mobile device 130-1 that needs to be registered, registers in a cell or sector 120 in which it is presently located, network apparatus can simply query the base station and determine the SAC for that cell or sector and so store SAC data in a location register. Registration in a cell where the cell knows its SAC presents the fewest changes to existing registration processes and supports either legacy or newer mobile devices. Typically this registration data is stored in a home location register (HLR) table but, if the mobile is roaming, is stored in a temporary copy visitors' location register VLR. The HLR and VLR will be referred to herein as a location register. Once the service area code (SAC) is determined for the mobile device by whatever means, the network controller 350 may determine the features such as vintage of the mobile device 130-1 and determine whether the mobile device 130-1 has the capability for storing its Service Area Code in its memory 390. On the other hand, retrieving a SAC or an SAI (PLMN identified) from a cell for paging does not require preservation of a SAC in mobile device memory, so legacy mobile devices may be registered, provisioned and paged by SAC determined via cell registration at an associated base station even if the mobile device has limited memory or no intelligence for receiving a SAC for storage.

In other words, memory 390 and intelligence in controller 385 may be provided, for example, in equipped newer mobile devices for storing their LAC and SAC. It may be very advantageous to store both the LAC and SAC in memory 390 of a mobile device. A service area code according to an embodiment may comprise, for example, two octets of data to cover, for example, all the counties of all the states of the United States. A minimum amount of data according to this embodiment is one octet (one of two hundred fifty-six) to cover the states or provinces or countries in North America and a maximum of three octets to cover smaller jurisdictions such as towns or campuses within North America for a given PLMN. The network controller 350, if the look-up demonstrates an appropriate vintage (for example, by version number) of software and hardware for mobile device 130-1, can download the LAC and SAC to the mobile device 130-1 and update their data in memory 395. The device 130-1 can report an error if GPS equipped and the controller 385 has the intelligence to determine if the network controller 350 may be wrong. An advantage of storing LAC and SAC in mobile device 130-1 memory 390 after registration, for example, is an example of traveling by plane across country or between countries. When the mobile device 130-1 is again powered after a plane flight, which device cannot be turned on due to FAA policy until the plane has landed, the mobile device may immediately report both its present location if equipped with GPS and the LAC and SAC in which it last registered so the PLMN in which it landed, if different, can immediately locate its home location register and route the registration request signal accordingly and update both the LAC and SAC in such memory and construct a VLR copy.

According to FIG. 3b, a mobile device comprises a power source 397, a processor or controller 385 for determining whether power has been actuated, a global positioning system 392 for determining a set of latitude and longitude location coordinates for the transmitting mobile device and a transceiver 380. It also comprises an antenna 375, the above-referred to memory 390 and input/output 395 which may be quite sophisticated, such as a keyboard, camera or mouse input and a display screen output or ports for a printer. The processor/controller 385 compares the network determined set of location data with a table for matching the location data with an internally stored table of service area codes in memory 390. Preferably, the internally stored set of SAC's is periodically updated during provisioning as will be further described below. The mobile device determines a service area code responsive to the comparison and stores the service area code in memory 390 of the mobile device. If there is a service area code already in memory 390 matching the location data determined by GPS 392 and the network determined and locally determined data conflict, the mobile device 130-1 may transmit an error message to the network controller 350. The network controller 350 may determine that the mobile device 130-1 has not been provisioned recently with a current table of SAC's and so download a new SAC table based, for example, on a SAC revision number or provisioning date or agree that the mobile device memory 390 has accurately stored the SAC in which it is located.

One final aspect of registration by SAC is tracking a mobile device from cell to cell during mobile travels so as to predict the cell in which the mobile device is destined. For example, a mobile device may be presently on a California interstate, powered "on" and periodically registering in cells as it travels in a given direction. The mobile device may be traveling at 60 mph and headed in a given direction and periodically transmitting registration request signals. As the mobile device moves in a set direction along a known path, a pattern may develop within the location register 360 by storing a history of registration data. The mobile device (and its subscriber) may be headed for a day trip to the San Diego zoo from its normal registration at their home in a SAC representing Carlsbad, Calif.

Historical tracking of SAC may be appropriate for predicting mobile device registration on a work week basis. The mobile device may be tracked from its home address to work and then from work to home each evening after work hours. In other words, it is an aspect of provisioning by SAC to track a mobile device and develop a history by service area code by time of day to accurately predict a SAC for paging as will be discussed later herein.

Thus there has been described a method of registering a mobile device 130-1 to a SAC that may be a legacy device or a newer model with more features based, for example, on comparing revision numbers of software or hardware of the device 130-1, uploading device stored information which may include a previously determined and stored LAC and SAC for the mobile device as well as a current LAC and location data. Also, the network controller of the PLMN where the device has landed and been actuated may accurately determine the LAC and SAC where last registered and immediately locate a location register 360 for the mobile device 130-1. Now a method of provisioning a SAC will be discussed with reference to FIG. 2, the SAC comprising at least one cell and being smaller in granularity than a LAC. Furthermore, a method of provisioning a collection of SAC's will be discussed. Both methods will be discussed with specific examples in mind such as short message service, emergency alert service, traffic jam reporting services and target advertising services by way of example.

Provisioning a SAC or a Collection of SAC's

FIG. 2 represents the location area code 100 of FIG. 1 further defining at least one service area code. In particular, three SAC's 210, 220 and 230 are shown. A given SAC 210 may be as small as one cell. While SAC 210, 220 and 230 are shown comprising contiguous cells geographically, the standard does not so require the cells of a SAC 210 be contiguous geographically. For example, an aspect of SAC provisioning may be to collect all the cells in a given time zone as a SAC #1 210, for example, comprising cells in Alaska and the western United States.

Time Zone Provisioning for 611

Time zone provisioning of SAC's may be useful, for example, for operator services such as information services to subscribers within the same time zone. Referring to FIG. 3a intended as an overall provisioning figure, a service such as 611 is provided inside or via secured connections outside the wireless network 300 (shown as outside). A live agent pool supporting an information or repair or assistance service such as a cellular 611 service 310 then may have the same work hours as the subscribers that use the service. The peak periods of 611 services may be measured and be more predictable per time zone and traffic and service queue measurements collected on a SAC basis.

Consider time zone provisioning for the west coast of the United States. In accordance with an aspect of time zone provisioning and by way of one example, not to be considered limiting, there may be a SAC #1 for the state of Alaska and a SAC#2 provisioned for the state of Washington and so on throughout the Western states in the same time zone. Considering an international area, a province or other similar region should be considered equivalent to a state and some countries are the size of a state of the United States. Provisioning such SAC's for each state of the Pacific time zone as a collection of SAC's may provide further granularity for each SAC than a LAC provides for a PLMN. For example, provisioning each state as a SAC or each state as a collection of SAC's of greater granularity than a state, i.e. a county or city, may define a live agent pool supporting 611 service 310 for that PLMN that may be local to each state and so more familiar with that state's characteristics and population of subscribers and characteristics. For example, a live agent pool in Alaska may include certain ethnic variables and the 611 service provisioned accordingly to have familiarity with American Indian populations and/or such activities as dog sled travel or cold related emergency services. To the contrary extreme, a Southern California desert region SAC 210 within the same time zone, may define a live agent pool including different American Indian ethnic considerations and/or such activities as desert rescue/stranded motorist rescue or heat related emergency services. By county is intended any region of a country of equivalent size such as a province of France and by city is intended the inclusion of smaller cities or towns or villages within the scope of city.

In connection with such a method of provisioning a SAC or collection of SAC's making up a time zone, a method of provisioning includes the steps of determining location data of cells within the time zone or more granular state, county, city or town. This determining a level of granularity for a SAC such as city, county or state within the time zone and defining SAC's for the level of granularity and the time zone may vary on an international basis for provinces, villages, towns, boroughs and other equivalent areas (not intended to be limiting). Once the level of granularity for the time zone is determined, for example, at the county level, then, the state may be determined as a collection of counties, each having their own SAC and the time zone may be determined as a collection of state SAC's. Of course, various combinations may come to mind such as choosing a county level granularity for California and a state level granularity for all of Rhode Island or the District of Columbia.

According to FIG. 3a, 611 service 310 may be directly associated with a network platform 330 (not shown as directly connected) for providing 611 service which may include interactive voice response and not connected via MSC 320. The network platform 330 may be directly associated with interactive voice response and, in the event of an IVR request for an agent, live agent resources (not shown) which may be inside or outside the network may be connected via network platform 330. In accordance with the 611 embodiment, the network platform may have an associated service profile stored in a service profile register 340 which defines 611 services. The service profile register 340 in the case of 611 service maintains data such as provisioned time zone SAC's or collections of SAC's related to 611 service. Consequently, to provide service to a mobile device 315 dialing 611 in a given time zone, the device 315 via base station 370 and associated controller 350 is registered in the location register 360 by SAC and the SAC forwarded by controller 350 to network platform 330. The network platform 350 can determine the SAC or collection of SAC's defined at controllers 350 for 611 service and interact with the dialing mobile device 315 in accordance with a provisioned SAC determined by the location register 360 for that mobile device 315 or collection of SAC's of which the registration SAC is a member via the service profile register 340. In this manner, a mobile subscriber dialing 611 at mobile 315 communicates with a 611 service position 310 or IVR equipment of platform 330 as called upon by the 611 application platform 330.

Short Message Service and Other Campus Provisioning

A college campus may be an active short message service region. One student may wish to text message another student to meet them in the student lounge. A corporate campus may have the same requirement so that one employee may text message another employee to remind them of a meeting or conference call. Consequently, it is an aspect of SAC provisioning to define a SAC 210 or collection of SAC's 210, 220, . . . as a college campus and another SAC or collection of SAC's as a corporate campus and so on for provisioning of services such as short message services which are used heavily within such campuses. Other examples of services used by college campuses that are presently popular may also be likewise provisioned by SAC or collection of SAC's for a campus such as the collection and downloading of music choices to mobile terminal devices 315 of the college students. Students are likewise interested in downloading of multimedia services such as movies to their portable mobile devices 315 for later play during periods of leisure (or studying).

Referring again to FIG. 3a, a network platform 330 may have access to a short message service profile register 340 and via controller 350 to a location register 360. The SAC for a mobile device 315 (for example, per FIG. 3b) within a campus wanting to communicate with another mobile device within the campus will be determined upon device registration. If the short message or other service is defined for a collection of SAC's provisioned to make up the campus, then a service profile register for the requested service may be consulted by a network platform 330 for that service. If the service is a short message service for the campus, then the service profile register 340 may define a paging area of a collection of SAC's for the called mobile device to receive a short message sent by the sending mobile device 315 within the same SAC or collection of SAC's. If the service is a music download or other multimedia download or play request, the network platform 330 will obtain the necessary resources to provide the service to requesting mobile device 315 within the SAC via location register 360 or collection of SAC's via profile register 340 by arranging to connect the requesting mobile device 315 with the resources.

In connection with such a method of provisioning a SAC or collection of SAC's making up a college campus for short messaging and other campus services, a method of provisioning includes the steps of determining location data of cells for a SAC or collection of SAC's for the campus. Determining a level of granularity for a SAC that is smaller than a city, county or state within a time zone and defining SAC's for the level of granularity of a small college campus as one SAC or collection of SAC's may be appropriate for a short message service or other campus scenario. Once the level of granularity is determined, for example, at the campus level greater than the cell level, then, a county may be determined as a collection of campuses, (as appropriate), each campus having their own SAC and the time zone may be determined as a collection of campus SAC's. Of course, various combinations may come to mind such as choosing a dormitory or building level granularity, for example, for a campus having a campus wireless LAN.

Emergency Alert Service

Emergency alert services have been known and mandated for, for example, natural disasters and for use in times of imminent peril or terrorist or other attack. Typically, for example, in the instance of hurricane warning and subsequent relief, the national weather service knows with a fair certainty of prediction the identity of counties susceptible, for example, to tornado alert or the identity of counties and states that are in danger of receiving a severe hurricane. Referring to FIG. 3a, in this case, assume a service/customer as the National Weather Service (service/customer 310) connected to wireless network 300. While a solid line is used in FIG. 3a, the drawing is intended to represent that the service/customer 310 (such as the National Weather Service) may be inside or outside the wireless network 300. According to one aspect of emergency alert service provisioning of a SAC 210 or collection of SAC's, the weather service provides command messaging and data indicative of an imminent natural disaster and a related message from service/customer terminal 310 which may be a text message or short message service message that is to be routed via PLMN 300 to mobile devices 315 (for example, FIG. 3b) via base stations 370 in the potential disaster area defined by the weather service as a collection of already provisioned SAC's. A wireless service provider (PLMN) 300 operating in a potential disaster area may immediately provision a SAC 210 or collection of already provisioned SAC's via a network platform 330 for emergency alert services by comparing the national weather service provided geographic data with the wireless provider's provisioned SAC's known to controller(s) 350 and EAS network platform 330. Once the SAC or collection of SAC's is determined and stored at service profile register 340, they may be re-provisioned as necessary by the customer/service 310, for example, the National Weather Service, to meet the needs of emergency alert broadcast services, for example, if a hurricane threatens different counties or states after an initial weather forecast. On the other hand, the wireless network 300 may arrange upon command from the service/customer 310 to broadcast an emergency alert message of the customer's choice to each provisioned SAC within the geographic area threatened by the weather warning.

Similarly, other disaster related agencies such as the Department of Defense or other federal or state agency may announce a threat and action that should be taken that can be broadcast as, for example, a short message to all impacted mobile devices 315 registered in the imminent peril region according to a SAC or collection of SAC's provisioned in a service profile register 340. Then, the Department of Defense or other state or federal agency takes the role of EAS service 310 and defines location data for determining a SAC collection profile in register 340.

In connection with the provisioning of any broadcast announcement service, such as EAS, it may be appropriate to consider provisioning with the language of the subscribers in mind. For example, in a given area of Louisiana or northern areas of Maine or New York near the Quebec, Canada border, it may be appropriate to determine cells of a SAC or provision a collection of SAC's in which French is spoken as the majority language in the cells of the SAC. There may be cells in New York City or San Francisco in which Mandarin (Chinese) is spoken more than English. There may exist cells within Los Angeles and, generally, in Southern California, southern Arizona, southern New Mexico and the Texas border with Mexico in which predominantly Spanish is spoken. As a consequence, the emergency broadcast message may be transmitted in the predominant language of the cell or collection of cells forming a language driven SAC or collection of SAC's, all such data being stored in service profile register 340 for defining a broadcast service. The network platform may be equipped to translate the short message transmitted by the customer/service 310 into a determined language on a SAC by SAC or cell by cell basis. The customer, on the other hand, may request the language be changed through short message query/response to the EAS network platform 330.

As introduced above, the collection of SAC's provisioned for a hurricane warning may change over time as weather predictions change. The database 340 storing the collection of SAC's provisioned for the emergency is a temporary database that associates a message with a time of broadcast and a periodicity of broadcast that would increase as the threat becomes more real. For example, the first announcement of a hurricane threatening a region of the country may be made as early as two or three days in advance of the expected landing. The periodicity of the next message may be twelve hours later. A wireless network 300 may not want to unduly load a message mail box of a subscriber mobile device 315 last registering in a SAC of an imminent disaster zone to over capacity. Within twelve hours of the storm landing, the periodicity and the threatened area and the degree of the threat become more and more clear. Consequently, the service/customer 310, such as the National Weather Service, may increase the periodicity, for example, to every three hours and change the content of a message to be broadcast and then, perhaps, every hour until the storm subsides to a non-life threatening level. Once the storm has cleared, the EAS service provided via network platform 330 and the provisioned collection of SAC's can be torn down and the service profile memory 340 released for other purposes (or preferably archived for historical purposes). A serving network platform 330 for EAS may be the same network platform discussed above for campus short message and other campus services. It may be the same network platform 330 as is used for 611 or other time zone services.

Rush Hour or, More Importantly, Accident and Fire Traffic Reporting

Rush hour traffic jam reporting is known and used extensively in metropolitan areas via public and private radio broadcast stations operating in the AM and FM bands. However, more rural areas such as long stretches of highway that may be located in a desert can be adversely impacted, for example, by a truck fire or a severe accident waiting to be cleared. There may be no or weak AM or FM radio coverage. Consequently, there may be a greater need for SAC provisioning for traffic reporting in a rural than a metropolitan area. In the event of metropolitan or rural traffic jams, local police, fire and rescue teams via their service terminal 310 in the vicinity of a fire or accident that may cause severe traffic delays in a geographic region, for example, may advantageously report the incident to a wireless service provider 300 and the network 300, in turn, provision or re-provision a SAC or collection of SAC's that define an area impacted by the traffic accident or fire at service profile register 340. As a result and as already alluded to above, a text message input via terminal 310 to a broadcast message network platform 330 may be broadcast to all mobile devices 315 registered in the vicinity of the accident or fire as a public service advising, for example, of alternate routes and the like the motorist may take.

Consider also the instance of a victim or witness of such an accident or fire. Many mobile devices 130-1, 315 are capable of reporting their location data and a photograph of an accident scene. As a preliminary step to the fire, police or rescue team's reporting an incident to a wireless network 300 in the vicinity, a subscriber who is a victim or a witness may report the incident to both the wireless carrier through 611 or other cellular services or via 911 emergency services from their mobile device 315. Per FIG. 3a, an exemplary path may be from mobile 315 via base station BS-1 370-1 to controller 350 whose location register has SAC data collected from the base station. As the cellular phone 315 is turned on, the registration request message can be coupled to a SAC immediately as soon as 611 or 911 are dialed. The call is routed to a 611, 911 broadcast message network platform 330 for determining if the accident has already been provisioned by the police/fire/rescue input from terminal 310. If not, the network platform 330 may alert the police/fire/rescue 310 and connect the caller at device 315 through to police/fire/rescue 310 to verify the mobile device report. After the calling mobile device 315 is verified, the police/fire/rescue team through terminal 310 may provision a SAC or collection of SAC's at service profile register 340 via network platform 330 for emergency broadcast text messaging. Regardless of whether the fire/police/rescue 310 or the mobile 315 first indicates the location of the impacted (by fire or other disaster) SAC via controller 350, the SAC provisioning or re-provisioning or traffic/accident/fire announcement is speeded accordingly. As with Emergency Alert Services, this traffic related broadcast service may be language differentiated and be provided via the same network platform 330 as other SAC or collection of SAC provisioned services.

Target Advertising Services by Provisioning a SAC or Collection of SAC's

Another example (but all such examples of SAC or collection of SAC provisioning are only limited by the imagination) is provisioning a SAC or collection of SAC's for target advertising. Many mobile devices 130-1 (FIG. 1), 315 (FIG. 3) are multimedia in nature. They may photograph images and may receive images. They receive short text messages, email messages and the like. It is known to establish customer profile data for a telephone service subscriber. Indeed, the subscriber may be interested in uploading music preferences, possible restaurant preferences, sports preferences and the like so they may receive messages and even advertisements of interest. An aspect of SAC or collection of SAC provisioning then is the provisioning of SAC's or collections of SAC's for target advertising services at service profile register 340 so that subscriber preferences may be matched by SAC with target advertising of interest. For example, a wireless subscriber may indicate an interest in a particular hotel chain, restaurant chain, travel carrier such as plane or train and rent-a-car agency. As a result, a SAC or collection of SAC's may be provisioned in advertising service profile register 340 for the particular hotel chain, travel carrier or rent-a-car agency. If a subscriber wishes, they may receive target advertising via network platform 330 for the travel entity of choice by the wireless carrier 300. The wireless carrier 300 compares the registration information of the subscriber by SAC via location register 360 with subscriber profile data and the subscriber profile data with the SAC or collection of SAC's at a service profile register 340 for each travel entity at service/profile register 340 and advise the subscriber, for example, when they arrive in San Francisco, Calif. of advertising announcing the location of their favorite restaurant and hotel or locate road-side or other travel assistance. As already suggested and with reference to FIG. 3a, the provisioning of SAC's for a given service or collection of services is only limited by the imagination and may involve special network platforms 330 equipped, for example, with interactive voice response for customer interaction or short message text capability or the like and each such network platform be associated with a service profile register 340 for preserving SAC and SAC collection provisioning data among other service/customer related data.

Historical Tracking of a Mobile Registering in a Collection of SAC's by Day/Week One final aspect of registration by SAC is tracking a mobile device from cell to cell during mobile travels so as to predict the cell in which the mobile device is destined for services such as follow me and call screening services if subscriber to by the wireless subscriber. Referring to FIG. 3a, a mobile device 315 may move from a cell served by base station BS-1 370-1 to BS-2 370-2 and elsewhere on a daily basis or establish a weekly schedule. SAC data, time of day and day of week may be preserved in accordance with one aspect of SAC provisioning in location register 360 and may be used for known "follow me" services that may be provided via a special service network platform 330 associated with such a service with SAC or collection of SAC data for the follow-me service stored and maintained additionally or alternatively in service profile register 340. A follow-me service may be automated to forward all calls to an associated destination telephone number according to a time of day and day of week. For example, when the subscriber is home and have their mobile off, an important call can ring the home phone automatically. Vice versa, during the day, an important call to an "off" cell phone can ring their wired office phone according to a previously stored wired destination number for office. On a weekend, for example, a mobile device may be presently on a California interstate, powered "on" and periodically registering in cells as it travels in a given direction. The mobile device 315 may be traveling at 60 mph and headed in a given direction and periodically transmitting registration request signals. As the mobile device 315 moves in a set direction along a known path (from SAC to SAC), a pattern may develop within the location register 360 by storing a history of SAC registration data. The mobile device 315 (and its subscriber) may be headed for a day trip to the San Diego zoo from its normal registration in a SAC representing Carlsbad, Calif. Target advertising for the zoo destination may be provided via network platform 330, traffic alerts for the interstate may be provided for the travel route or, if instead headed for a friend or family member, calls automatically forwarded to a predetermined, previously stored wired destination telephone of the friend or family member.

Historical tracking of SAC may be appropriate for predicting mobile device registration on a work week basis. As suggested above, the mobile device may be tracked by time of day from its home address to work and then from work to home each evening after work hours. The subscriber may be prompted to enter work and home destination wired telephone numbers into a call forwarding register for call screening and important call forwarding to the stored wired destination phone or other purposes by time of day. In other words, it is an aspect of provisioning by SAC to track a mobile device 315 and develop a history to accurately predict a SAC for paging or determining a destination wired telephone. The service may additionally involve the entry of call screening data via the mobile device 315 or otherwise so that only important calls are forwarded to the wired destination phone when the mobile device is powered down or "off" or in a mode of not receiving calls at the subscriber's option.

Paging by SAC

Figure 4:
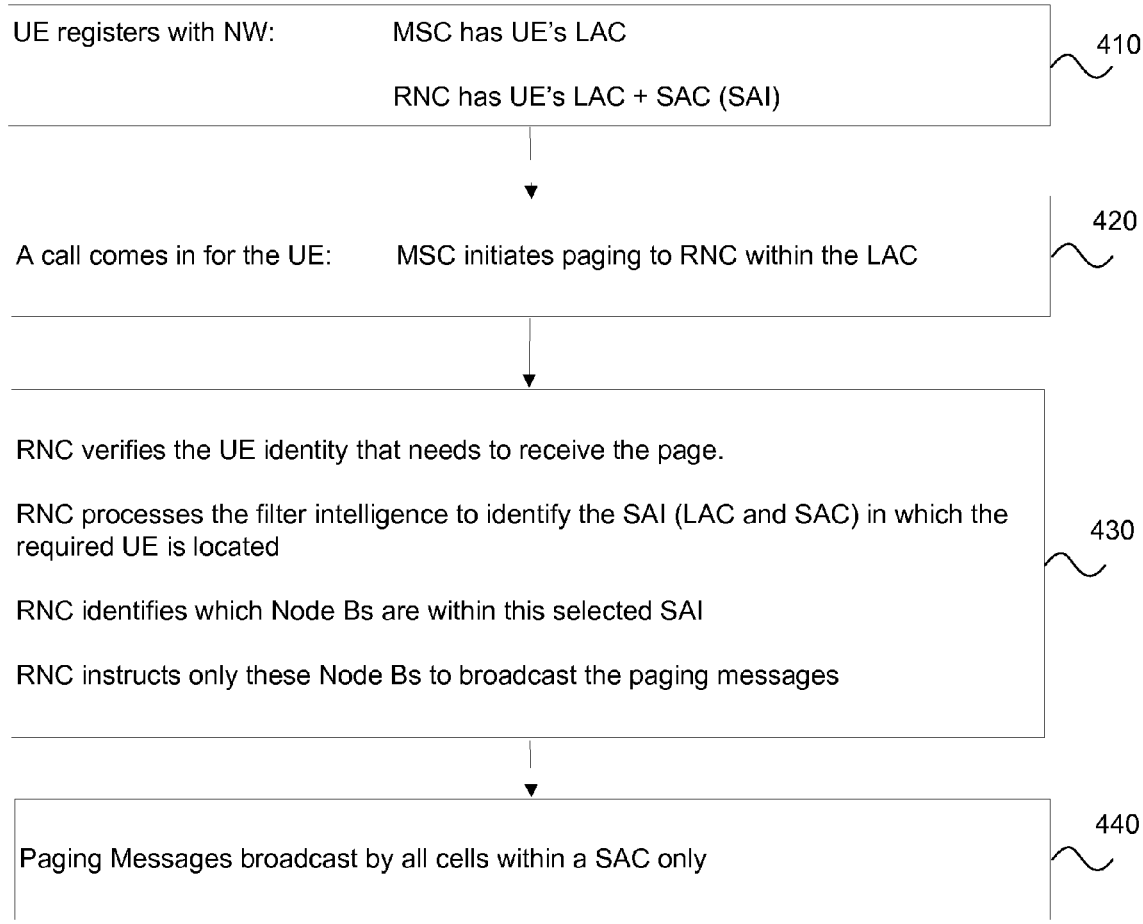
FIG. 4 represents a flowchart of a method of paging a mobile device which includes the step of beginning by paging a location area code and, once a service area code is associated with the mobile device, paging the service area code.

FIG. 4 represents a flowchart of a method of paging a mobile device which includes the step of beginning by paging a location area code (LAC) and, once a service area code is associated with the mobile device, for example, mobile device 240 of FIG. 2, paging the service area code 210 in which the mobile device 240 is located in stead of or to replace the traditional method of paging by LAC. Paging/filtering by SAC intelligence is a module of software provided for controller 350. It may be up to the controller 350 to determine which base stations or cells of a SAC (or collection of SAC's) need to receive paging control signals for broadcast. The decision to page a registered UE 240 that needs to be paged in a SAC or a collection of SAC's may be transparent to the mobile device 240. Legacy and newer model mobile devices 240 can listen for paging messages addressed to them as specified by the standards. It is believed that current standards making bodies will be resistant to immediately paging by SAC without permitting legacy equipment to perform the standard method of paging a registered mobile device 240 by LAC.

Referring to FIG. 4, there is shown a first known step 410 discussed above in some detail of UE, for example, UE 240 registering with its wireless network (PLMN) 300 in a known manner. The wireless network (NW) 300 has caused the UE's LAC in which it last registered to be stored and the MSC 320 receiving an incoming call has access to the LAC. The RNC or controller 350 has access to determine the UE's current LAC (and, not in presently known processes, a SAC or SAI) collected on a PLMN 300 basis from a location register 360. When a call comes in for the UE 240, step 420 shows the known step of an MSC 320 initiating a paging according to standard practices of sending paging control signals to a plurality of associated controllers 350 within the LAC to begin paging via all the cells within the LAC (FIG. 1). An aspect of paging by SAC is to permit the present method of paging by LAC to continue but to initiate in areas so equipped or PLMN's choosing to do so a paging by SAC. In other words, a given PLMN may phase in over time a paging by SAC as registration by SAC and provisioning by SAC are implemented over time.

In step 430, and in accordance with paging by SAC, the RNC 350 verifies the UE identity that needs to receive the page from the SCP or mobile switching center 320 database within the wireless network 300. Then, according to step 430 the controller 350 possesses filter intelligence to identify the SAI (SAC) or the SAC within the LAC in which the UE, for example, UE 240 is presently "on" and ready to receive a call or last registered and needs to be paged. Next in step 430, the controller identifies which Node B's 250 (collection of base stations) are within the selected SAC/SAI. Finally, in this step of filtering by SAC/SAI, the RNC can instruct only those base stations within the SAC (rather than the LAC 100), for example, SAC#1 210 of FIG. 2, to broadcast the paging control signal messages. If directional antennas are used, specific cells or sectors may be paged associated with node B 250 or specifically if within a SAI cell 255.

Step 440 may follow the filtering step of step 430 by initiating a broadcasting of paging control signals in only the cells belonging to the base stations within the SAC of the UE, for example, cell 255 among others provisioned as a SAC in which UE 240 is assigned. An associated public land mobile network (PLMN) capable of receiving paging signals thus first determines a location area code (LAC) responsive to an incoming call to a wireless destination number of the associated public land mobile network (PLMN) according to known processes, determines last registration data including location area code for the registered mobile device having the wireless destination number and, if available, SAC data per step 410. At step 420, the PLMN initiates transmitting paging control signals to cells from a plurality of base stations within the location area code 100 for the associated public land mobile network. But at step 430 which is one aspect of the paging by SAC invention, the PLMN determines if last registration data for the mobile device further comprises a service area code, if the last registration data for the mobile device comprises a service area code or service area identifier and ceases transmission of paging control signals to cells within the location area code (LAC). In stead, at steps 430 and 440, the PLMN determines at least one base station (node B 250) for the service area code of the last registration data and begins transmitting paging control signals from the determined at least one base station of the SAC.

Figure 5:
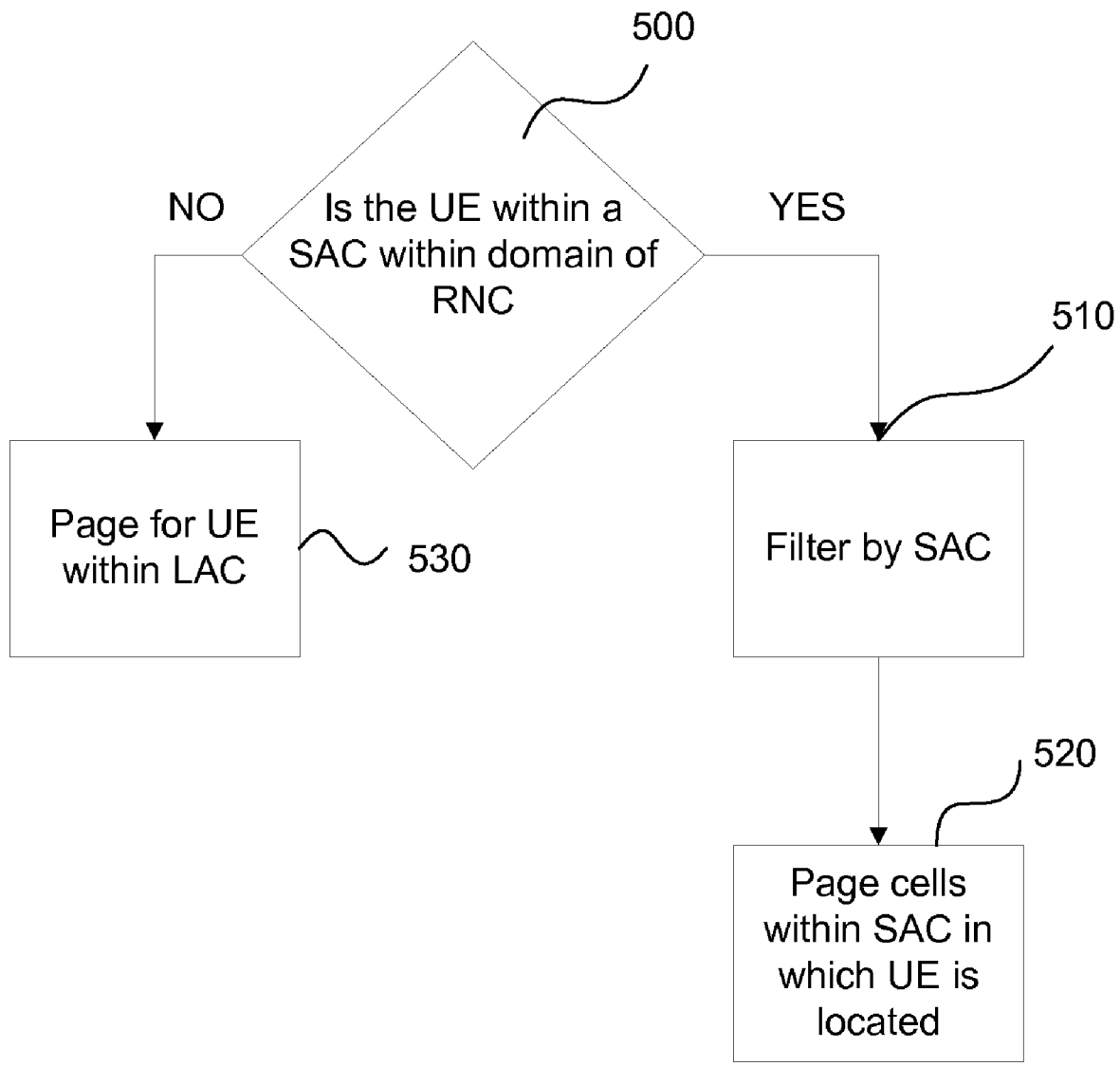
FIG. 5 represents a flowchart of an alternative method of paging a mobile device which first determines if the mobile device is associated with a service area code and then paging only within the associated service area code.

In accordance with a related aspect, a method of paging a registered mobile device of an associated public mobile network capable of receiving paging signals does not rely on LAC paging and immediately initiates paging by SAC as appropriate. Referring to FIG. 5, there is shown a flowchart for an overall process for a PLMN going forward after adopting a SAC based registration process for mobile devices. Step 500 shows the decision box: Is the UE, for example, UE 240, within the SAC, for example, SAC #1 210, within the domain of the radio network controller 350 associated with that SAC where the UE last registered. (The UE may now be located outside the country or in a different LAC). If the registration data by LAC is stale and has become either dated or the mobile has been tracked moving in a given direction and the direction or trail cannot point to a reasonable SAC for paging, the answer to the decision box should be "no" and paging begin at step 530 by LAC by PLMN in a conventional manner at least within the country beginning with the wireless network 300 of choice. On the other hand, if the mobile device has recently registered by SAC, at step 310, the wireless network controller 350 should filter by SAC within the LAC to identify the whereabouts of the UE to which a call is incoming. Then, at step 320, the wireless network controller 350 should transmit paging control signals to the base stations 370 of the cells of the SAC where the UE last registered.

A method of paging by SAC according to FIG. 5 thus comprises determining if last registration data for the registered mobile device further comprises a service area code, determining at least one base station for the service area code of the last registration data and beginning transmitting paging control signals from the determined at least one base station. If the UE is not within a SAC within a LAC within the wireless network 300 as determined by the controller 350, conventional paging by LAC is performed. By following the SAC paging method of FIG. 4, a given public mobile network may treat the paging of a mobile device by service area code as optional and a standards body need not dictate a requirement that paging by service area code be practiced. A wireless network may phase in SAC paging as it phases in SAC registration and provisioning. By following the SAC paging method of FIG. 5, it is assumed that paging by LAC is a last resort, for example, when the PLMN has changed and the mobile has moved outside an area served by the PLMN of choice. It is also assumed that SAC registration and SAC provisioning and paging by SAC have been fully implemented within the PLMN so that the wireless network 300 does not have to immediately begin with a known step 410.

In accordance with a paging method described by FIG. 5 that does not use the location area code unless necessary (i.e. data has become stale or the mobile has moved nationally), a method of paging a registered mobile device of an associated public mobile network capable of receiving paging signals comprises determining if last registration data for the registered mobile device further comprises a service area code, if the last registration data for the mobile device comprises a service area code, determining at least one base station for the service area code of the last registration data and transmitting paging control signals from the determined at least one base station. FIG. 5 represents a flowchart of this alternative method of paging a mobile device which first determines if the mobile device is associated with a service area code and then paging only within the associated service area code most of the time.

Thus there has been described a method of paging by SAC which does not involve disturbing existing paging by LAC methodology and a method of paging by SAC going forward that may be used by a PLMN that adopts registration by SAC and provisioning by SAC. Other aspects and embodiments and their scope may be determined from the claims which follow which should not be considered limited by the detailed description of the embodiments. In deed, many other aspects and embodiments should come to mind of one of skill in the art as, for example, the application of SAC's or collection of SAC's to provisioning of services and service areas are only limited in concept by the imagination of the designer.

What I claim is:

1. A method of registering a mobile device in a mobile telecommunications network comprising:
   receiving a registration request signal including mobile device identification data at a controller;
   determining at the controller a base station and cell from which said registration request signal is received;
   comparing the base station and cell with a table for matching the base station and cell with at least one service area code;
   determining the at least one service area code responsive to the comparison;
   storing the determined service area code, the mobile device identification data and a location area code of the associated public mobile network for registering the mobile device in a location register of the associated mobile network;
   tracking the mobile device over time in a plurality of service area codes by time of day and storing a the plurality of service area codes reflecting the tracking of the mobile device;
   and
   predicting a mobile device future service area code based on the tracking;
   and
   forwarding a mobile device call that is directed to the mobile device being tracked to a wired telephone based at least in part on the predicted service area code.

2. The method of registering a mobile device in a mobile telecommunications network as recited in claim 1 wherein the time period for the tracking is at least one day.

3. The method of registering a mobile device in a mobile telecommunications network as recited in claim 2 wherein the tracking over time comprises a weekly collection and storing of mobile registration data.

4. The method of registering a mobile device in a mobile telecommunications network as recited in claim 1 further comprising downloading the determined service area code to the mobile device for storage in memory thereof.

5. The method of registering a mobile device in a mobile telecommunications network as recited in claim 4 further comprising receiving a registration request signal including mobile device identification data and the service area code stored in the memory of the mobile device.

6. A method of registering a mobile device in a mobile telecommunications network comprising:
   receiving a registration request signal including mobile device identification data at a controller;
   an associated mobile network determining geographic location data for the transmitting mobile device;
   comparing the geographic location data with a table for matching the location data with at
   least one service area code;
   determining the at least one service area code responsive to the comparison;
   storing the determined service area code, the mobile device identification data and a location area code of the associated mobile network for registering the mobile device in a location register of the associated mobile network;
   tracking the mobile device over time in a plurality of service area codes by time of day and storing the plurality of service area codes reflecting the tracking of the mobile device;
   predicting a mobile device future geographic location based on
   the tracking;
   and forwarding a mobile device call that is directed to the mobile device being tracked to a wired telephone based at least in part on the predicted geographic location.

7. The method of registering a mobile device in a mobile telecommunications network as recited in claim 6, wherein the time period for the tracking is at least one day.

8. The method of registering a mobile device in a mobile telecommunications network as recited in claim 7 wherein the tracking over time comprises a weekly collection and storing of mobile registration data.

9. The method of registering a mobile device in a mobile telecommunications network as recited in claim 6 further comprising downloading current service area code registration data, including the determined service area code, to the mobile device for storage in memory thereof.

10. The method of registering a mobile device in a mobile telecommunications network as recited in claim 9 further comprising receiving a registration request signal including mobile device identification data and the service area code registration data stored in mobile device memory.

11. A method of registering a mobile device in a mobile telecommunications network comprising:
   receiving a registration request signal from a mobile device including determined location coordinates for said mobile device and mobile device identification data;
   comparing the received location coordinates, including latitude and longitude location coordinates, with a table for matching the location coordinates with a service area code;
   determining at least one service area code responsive to the comparison;
   storing the service area code for registering the mobile device in an associated public mobile network along with the mobile device identification data;
   downloading the service area code to the mobile device for storage in memory thereof;
   tracking registration of the mobile device over time in a plurality of service area codes by time of day and storing the plurality of mobile device service area codes reflecting the tracking of the mobile device; and
   predicting a mobile device future location based on the tracking; and
   forwarding a mobile device call that is directed to the mobile device being tracked to a wired telephone based at least in part on the predicted location.

12. The method of registering a mobile device in a mobile telecommunications network as recited in claim 11; wherein the time period for the tracking is at least one day.

13. The method of registering a mobile device in a mobile telecommunications network as recited in claim 12 wherein the tracking over time comprises a weekly collection of mobile registration data.

14. The method as recited in claim 11 further comprising the mobile device transmitting the service area code stored in the memory of the mobile device in association with a subsequent registration request.

* * * * *

UNITED STATES PATENT AND TRADEMARK OFFICE
CERTIFICATE OF CORRECTION

PATENT NO.       : 7,974,645 B2                               Page 1 of 1
APPLICATION NO.  : 11/468578
DATED            : July 5, 2011
INVENTOR(S)      : Yung Shirley Choi-Grogan It is certified that error appears in the above-identified patent and that said Letters Patent is hereby corrected as shown below:

In column 19, Claim 1, line 42, please remove "a";
In column 19, Claim 1, line 45, please remove "and";
In column 19, Claim 1, line 48, please move "and" to line 47 after "tracking;";
In column 20, Claim 6, line 22, please move "the tracking;" to line 21 after "based on";
In column 20, Claim 6, line 23, please move "and" to line 22 after "the tracking;".

Signed and Sealed this
Thirtieth Day of August, 2011

David J. Kappos
*Director of the United States Patent and Trademark Office*